Aug. 8, 1961 R. G. HOLMAN 2,994,913
APPARATUS FOR PRODUCING A CONTINUOUS STRIP OF ELASTIC MATERIAL
Filed July 7, 1958 5 Sheets-Sheet 1
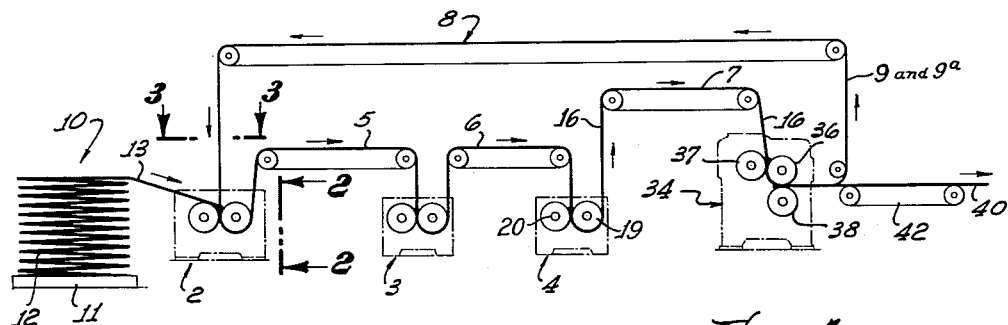
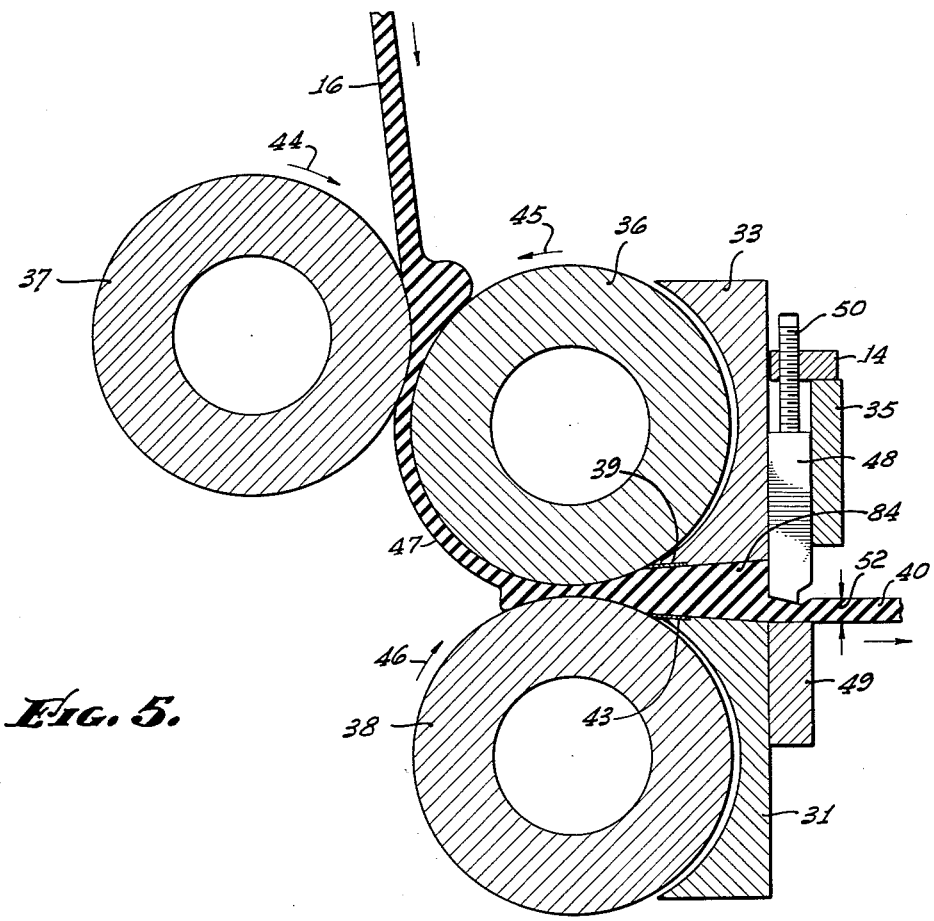
INVENTOR.
Rudolph G. Holman
BY
Nicholas T. Volsk
his ATTORNEY.

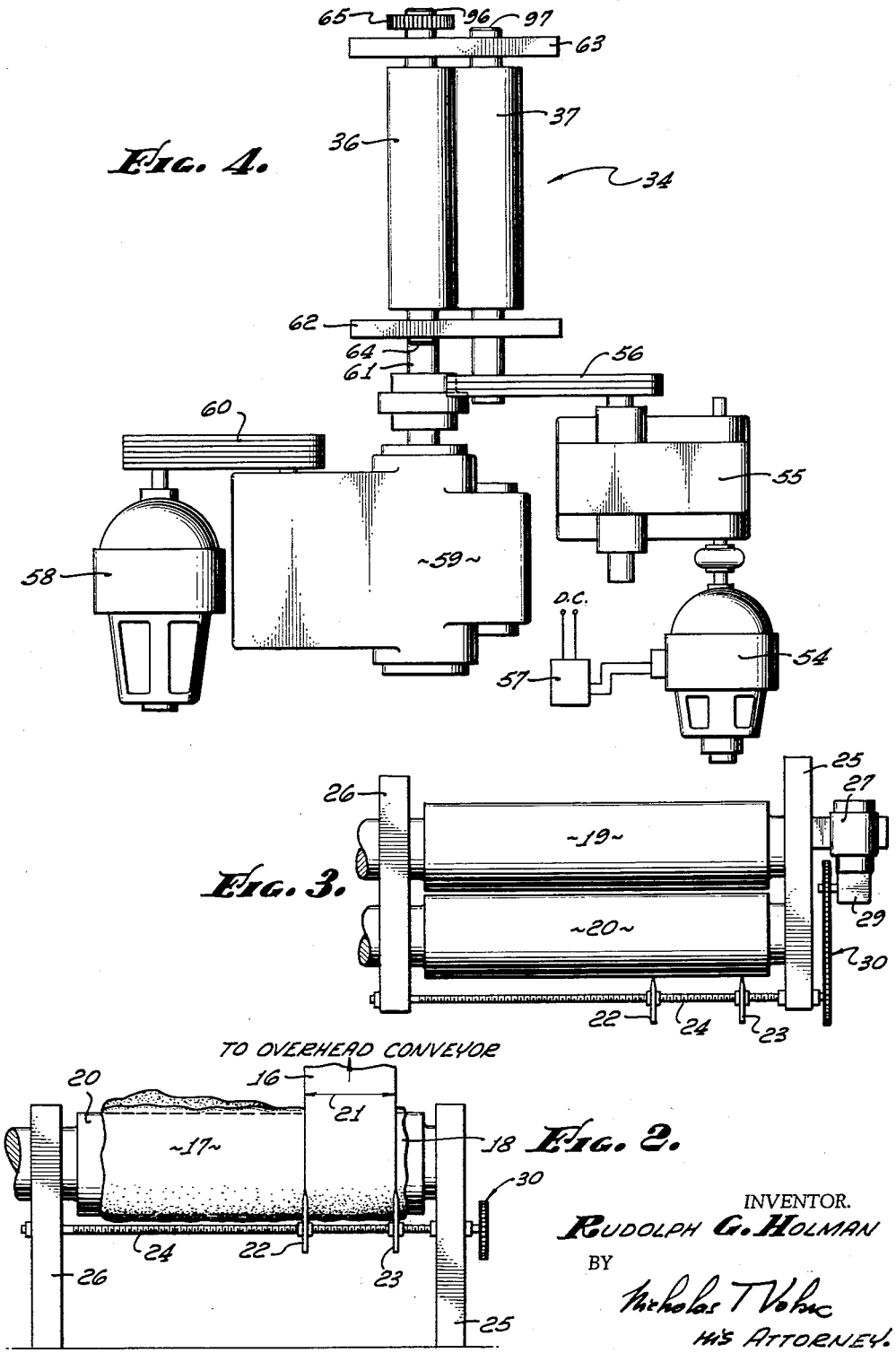

Aug. 8, 1961    R. G. HOLMAN    2,994,913
APPARATUS FOR PRODUCING A CONTINUOUS STRIP OF ELASTIC MATERIAL
Filed July 7, 1958    5 Sheets-Sheet 3
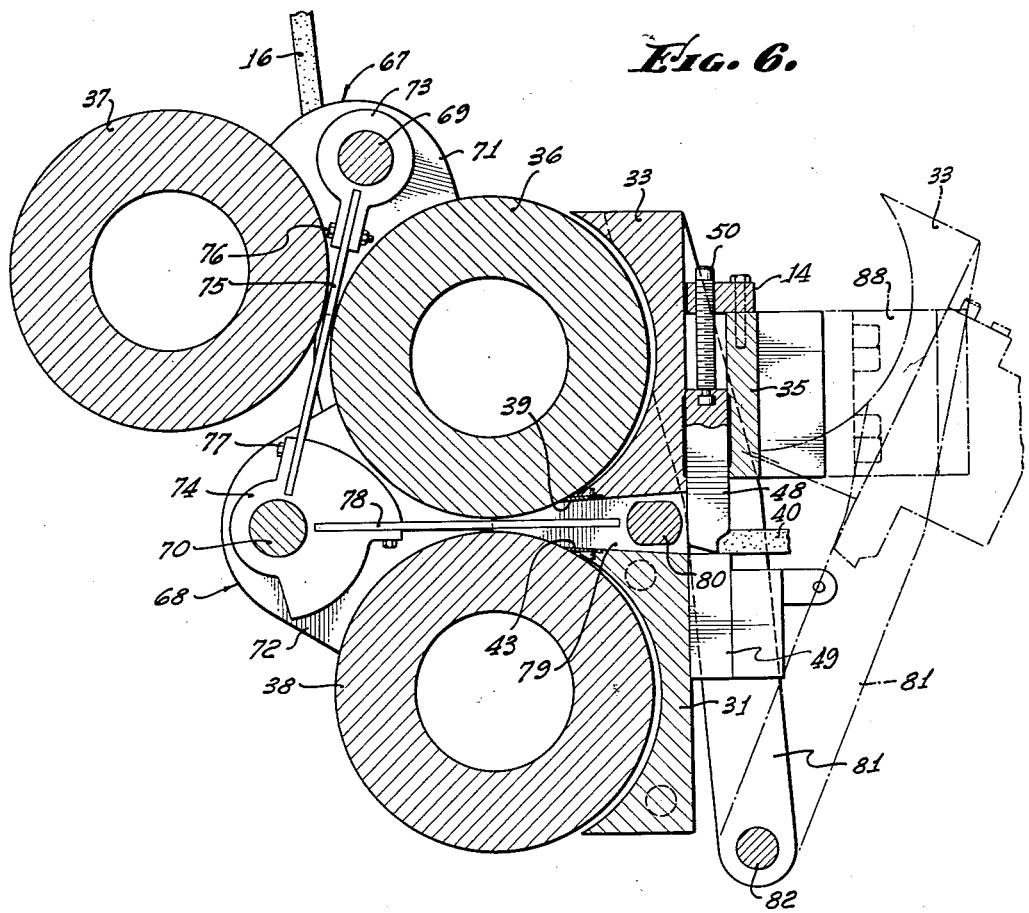
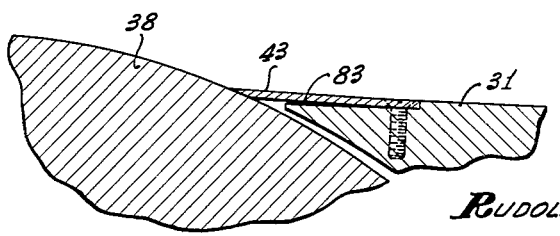
INVENTOR.
RUDOLPH G. HOLMAN
BY
Nicholas T. Volsk
HIS ATTORNEY.

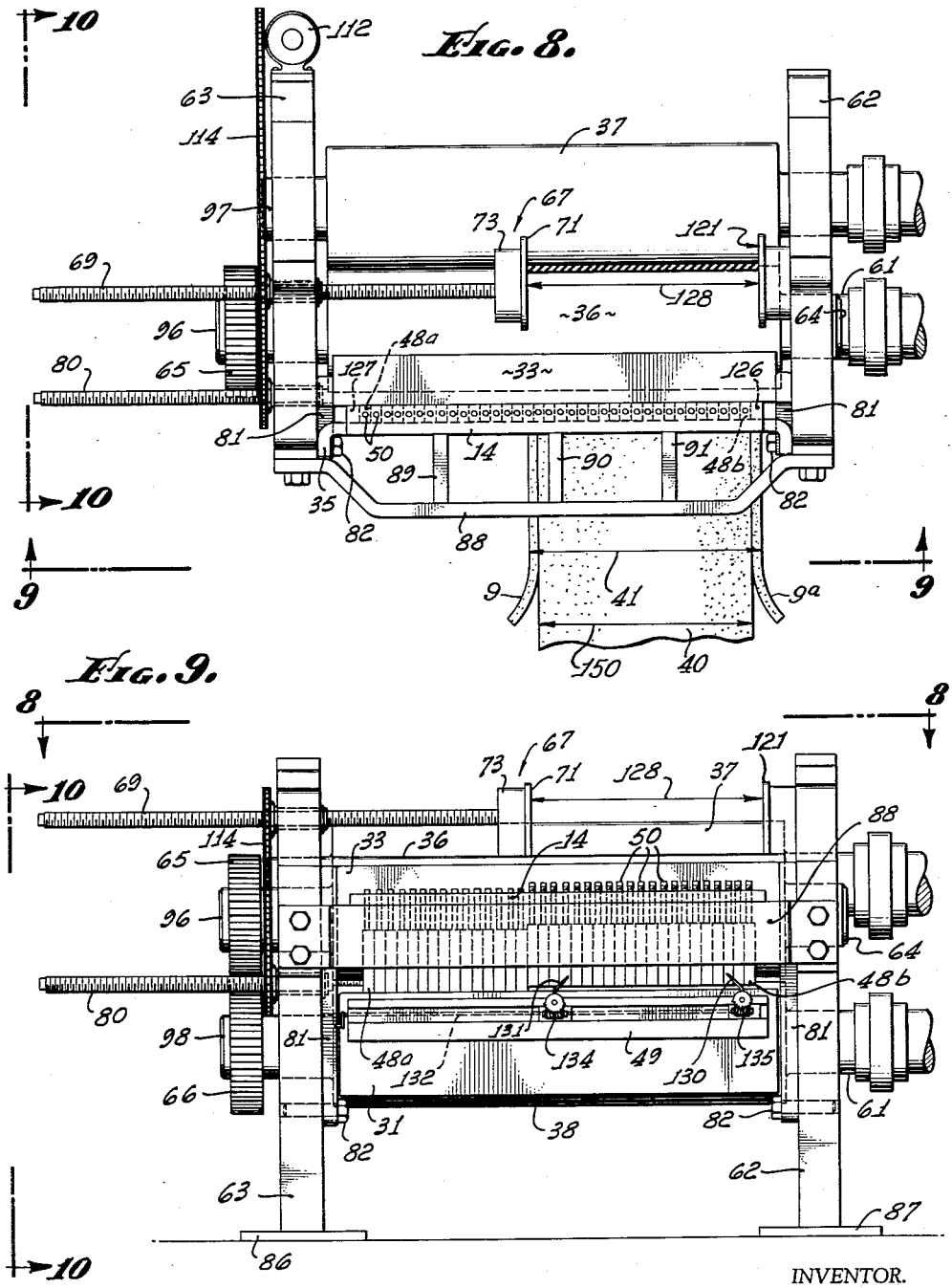

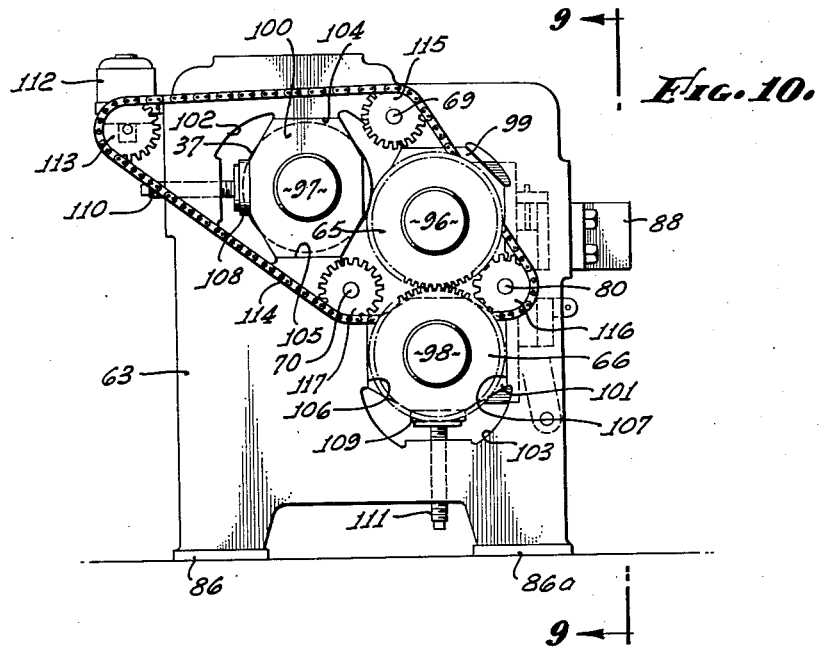
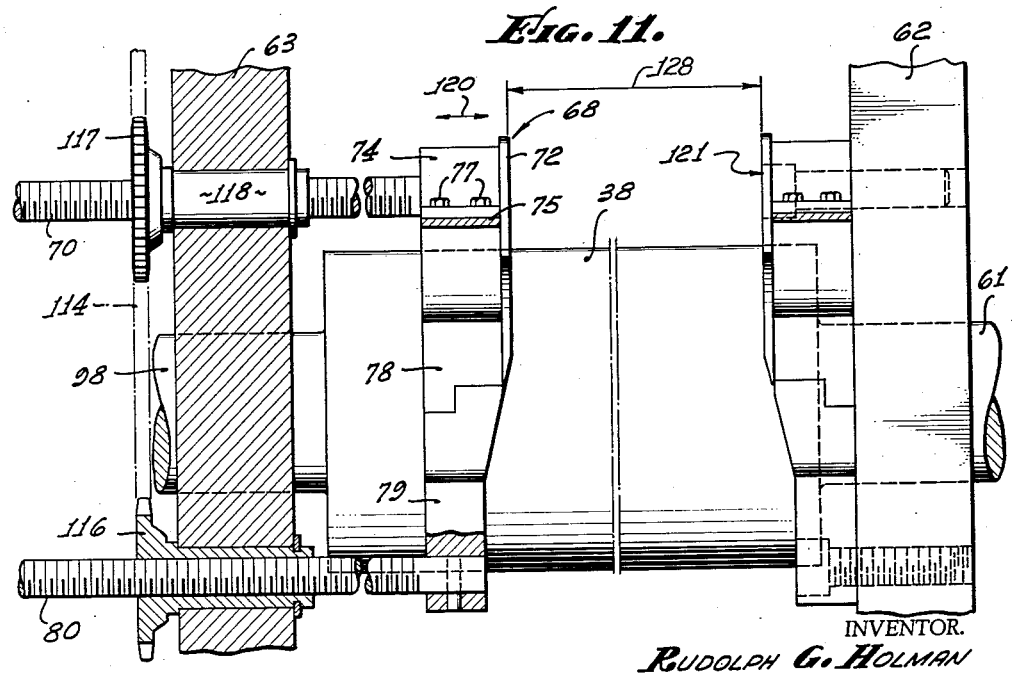

United States Patent Office 2,994,913
Patented Aug. 8, 1961

2,994,913
APPARATUS FOR PRODUCING A CONTINUOUS STRIP OF ELASTIC MATERIAL
Rudolph G. Holman, La Habra, Calif., assignor to W. J. Voit Rubber Corp., a corporation of California
Filed July 7, 1958, Ser. No. 747,069
3 Claims. (Cl. 18—2)

This invention relates to methods and apparatus for producing a continuous, properly shaped strip, or ribbon, of an elastic material, such as rubber, synthetic resins and, in general, materials of that type, whose viscosity permits their extrusion through dies. The invention discloses a roller head extruder for producing the strip, or ribbon, of the above type.

The principal users of the extruders of the above type are the rubber industry and the palstics industry. The extruders now in use utilize a feeder screw which feeds the material into an extrusion die. The disadvantages of such known extruders are described below. It is possible to obtain only a limited range of the ribbon widths with such extruders. If the outside diameter of the feeder screw is in the order of three inches, then the practicable limit for the width of stock, or ribbon, is in the order of six inches. Accordingly, in order to obtain stock width of, say, thirty-six inches, it is necessary to have an entirely different extruding machine with a feeder screw having a twelve-inch outside diameter, which it not suitable for narrow sizes of the "chocking" in the adapter. All extruders using a screw feed require very large horsepower motors because of the high friction produced in the feeder. Because of very high pressure exerted by the feeder screw on the rubber stock, there is a very high friction between the rubber and the feeder. This high friction raises the temperature of the rubber stock, with the concomitant deleterious chemical and physical effects on the rubber. The physical effects manifest themselves in difficulties of obtaining stock of uniform dimensions and of homogeneous density and composition.

Another version of the known extruder, now in use by the tire industry, uses a feeder screw which feeds the material into a die and the material leaving the die is then fed into two rollers. One roller is a cylindrical roller of uniform cross-section, while the second roller is shaped so as to produce a strip of rubber having a trapezoidal cross-section, or some other type of cross-section called for by the desired tire tread material. This method eliminates some of the difficulties encountered with the first extruder. It requires less power and lower pressure, and, therefore, lower temperature. However, this method of extruding is suitable for producing only one size of strip continuously because any change in shape requires replacement of at least one roller which is shaped so as to impart the desired cross-section to the outgoing ribbon. Therefore, the method lacks adjustability, flexibility of operation and is quite expensive because of the high cost of the shaped rollers. Therefore, this method is used, for example, for producing new tread rubber strips used in making new tires where the dimension of any given strip remains constant, and it is not practical, from the cost point of view, for example, for producing such material as "camelback" used for retreading used tires. For such use, one must have some ready means for changing the dimensions of the ribbon from time to time because of the necessity of producing "camelback" for a large number of types of tires having radically different dimensions, such as truck tires, passenger car tires, etc.

In the disclosed method and apparatus, the so-called "slab stock" (rectangular pieces of rubber) is fed into a series of kneading rollers where the normally cold slab stock is warmed up, kneaded and transformed from interconnected, flat, rectangular slabs of cold rubber into a continuous, warmed-up and thoroughly kneaded ribbon of rubber. These rollers are generally called the "warm-up mill." This ribbon is then lifted by a conveyor to a higher level and then lowered from the conveyor into a three-roller extruder, which includes three rollers and an adjustable die. Rollers #1 and #2, in combination, comprise a gauging mill, while rollers #1 and #3, in combination, comprise a calender mill. The calender mill feeds the material into an adjustable die which finally produces the ribbon of the desired dimensions. The above combination of elements eliminates all of the disadvantages encountered with the known apparatus, such as high horsepower requirements, high temperature of operation with the impairment of the material, and lack of ready adjustability.

It is, therefore, an object of this invention to provide a rubber processing apparatus including a plurality of warm-up mills and a three-roller extruder which includes a gauging mill, a calender mill and an adjustable die.

It is also an object of this inevntion to provide an apparatus for transforming such material as rubber slab stock, or other thermoplastic materials, into a continuous ribbon of desired dimensions by feeding these slabs into warm-up mills, reworking these slabs in the warm-up mills, cutting out a portion of predetermined adjustable width from the material being kneaded at each warm-up mill, including the last warm-up mill, feeding this portion into a three-roller extruder for gauging, calendering and finally extruding said material through an adjustable die for producing a continuous ribbon stock having uniform dimensions, density, composition, and unimpaired by any excessive temperatures common in the known methods.

It is also an object of this invention to provide a three-roller extruder including first, second and third rollers, the first and second rollers constituting a gauging mill, the first and third rollers constituting the calender mill, the calender mill feeding the material into an adjustable die for producing a continuous ribbon stock on the exit side of the die, the final ribbon stock having uniform dimensions, homogeneous density and composition, and free of any decomposition or break-down products which occur when the product is subjected to excessive temperatures.

The novel features which are believed to be characteristic of this invention, both as to its organization and methods of operation, together with further objects and advantages thereof, will be better understood from the following description given in connection with the accompanying drawings in which the invention is illustrated by way of an example. It is to be understood, however, that the drawings are for the purpose of illustration only and are not intended as a definition of the limits of the invention.

Referring to the drawings:
FIG. 1 is a side view of the entire apparatus used for producing the ribbon;
FIG. 2 is a transverse, vertical side view of one of the warm-up mills, the direction of this view being illustrated by line 2—2 shown in FIG. 1;
FIG. 3 is a top plan view of the same warm-up mill taken in the direction of line 3—3 illustrated in FIG. 1;
FIG. 4 is a top plan view of the three-roller extruder which also includes the view of the two drive motors and two gear boxes used for driving the extruder;
FIG. 5 is an enlarged vertical section of the three rollers and of the die, taken approximately through the center, or middle, of the rollers;

FIG. 6 is the identical vertical section of the rollers shown in FIG. 5, which also includes the view of the die and of the adjustable side guides or retainers;

FIG. 7 is an enlarged vertical section of the scraper blades used for scraping the two rollers of the extruder;

FIG. 8 is a top plan view of the extruder taken in the direction of line 8—8 illustrated in FIG. 9;

FIG. 9 is a side view (rear end view) of the extruder taken in the direction of line 9—9 shown in FIGS. 8 and 10;

FIG. 10 is a side view of the extruder, the view being taken from the side illustrated by line 10—10 shown in FIGS. 8 and 9, and FIG. 11 is an enlarged top plan view, partly in section, of that portion of the extruder which illustrates one of its rollers and the adjustable side guides or retainers.

While the invention will be described in connection with the production of a continuous rubber ribbon, it is to be understood that the method and the apparatus, as mentioned previously, are applicable for producing continuous ribbon from any such thermoplastic materials.

Referring to FIG. 1, the rubber stock 10 rests on a mobile platform 11. This stock is illustrated in the form of a continuous stack of rubber slabs 12 which are interconnected with each other by means of partially cut stock. The stack of the above type is produced by first introducing the ingredients of the rubber stock into a Banbury mixer (or Shaw or Bolling mixer), then passing it through a screw extruder, calender and rotary cutter and creaser, which are disclosed in my co-pending application, Serial No. 810,803, filed May 4, 1959, and entitled "Continuous Stacking System."

While it is quite convenient, for practicing the disclosed method, to begin with rubber stock in the form of rubber slabs which form zig-zagged, or accordian-like, interconnected slabs of rubber, it is not essential to have the rubber stock in this form for practicing the method. For example, the rubber ribbon 13, fed into a warm-up mill 2, may be taken directly from the previously-mentioned calender which follows the Banbury mixer.

Since, in the disclosed method, the rubber stock is in the form of the so-called slabs 10—12, it is desirable to have several kneading and warm-up mills 2, 3 and 4 for more thoroughly mixing, kneading and warming up the stock so as to produce a continuous ribbon 16 which is cut from the rubber stock 17 and 18 illustrated in FIG. 2. The rubber stock 17 and 18 and ribbon 16 constitute one single continuous sheet of rubber produced by the warm-up rollers 19 and 20 of each warm-up mill 2, 3 and 4. The width 21 of ribbon 16 is determined by the setting of two knives 22 and 23 which are mounted on a partially threaded rod 24 supported by the frame members 25 and 26 of the warm-up mill. These frame members also support the rollers 19 and 20 of the warm-up mill. Knife 23 remains in a fixed position on rod 24 while the position of knife 22 on rod 24 may be adjusted by operating the reversible gear motor 27 (FIG. 3), which is connected through appropriate gears 29 and a sprocket drive 30 to rod 24. The width 21 of ribbon 16, therefore, can be varied by operating motor 27. This width is adjusted so as to correspond roughly to the width 41 of ribbon 40 leaving the extrusion die, FIG. 5, when the thicknesses of the two ribbons 16 and 40 are equal. The above may be restated on a more fundamental basis by saying that the dimension of ribbon 16 is adjusted so as to more than comply with the continuity equation of fluid dynamics, the excess amount being returned at 9 in FIG. 1.

Upon leaving the warm-up mill 4 in FIG. 1, ribbon 16 is picked up by a conveyor 7 which is positioned above the warm-up mill 4. Conveyor 7 then lowers ribbon 16 into the three-roller extruder 34. Therefore, extruder 34 receives this ribbon after it leaves conveyor 7. Such positioning of conveyor 7 above the warm-up mill and above the extruder is desirable so that the head stock, which is ribbon 16, is fed into extruder 34 from above. Such feeding from the top of the stock into warm-up mills 3 and 4 by conveyors 5 and 6 and the extruder 34 by conveyor 7 introduces the material into the bite of the rollers for its ready assimilation into the mass of material which is being kneaded by the rollers. As indicated in FIG. 1, extruder 34 includes three rollers 36, 37 and 38. These three rollers also appear on an enlarged view in FIGS. 5 and 6 where they are similarly numbered.

The head stock 16, after passing through extruder 34, leaves the latter in the form of a continuous ribbon 40 which is cooled and conveyed by means of a conveyor 42 to any desired destination, such as spools used for winding ribbon 40.

The functioning of the three-roller and die extruder is best illustrated in FIG. 5. As shown in FIG. 5, the three rollers are rollers 36, 37 and 38 which rotate in the directions indicated by arrows 44, 45 and 46. The head stock 16 is fed into rollers 36 and 37, which, in combination, represent a gauging mill, or the mill which adjusts the thickness of a ribbon 47 to that which is most suitable for producing the proper functioning of the rollers 36 and 38. The rollers 36 and 38 constitute a calender mill which feeds the rubber stock into an extrusion die.

This die is composed of a plurality of adjustable gate members 48 and an anvil 49, which is retained in a fixed position by means of frame members 62 and 63 (see FIG. 9) and transverse members, including bars 14 and 35 and blade holders 31 and 33 (see FIG. 6) which support the scraper blades 39 and 43. These scraper blades engage the respective rollers 36 and 38. The construction of the scraper blades and of their holders, as well as the construction of all the die members, will be described more in detail in connection with the remaining figures. The lateral, or the side, retention of the rubber stock as it travels through the extruder and the three rollers, as well as the adjustable die, is accomplished by means of the side guides, or retainers, and the die cheeks which are illustrated in FIGS. 6, 8, 9 and 11, and, therefore, will be described more in detail in connection with the above figures.

The gates 48 have an up-and-down adjustment which is obtained by means of the gate-adjusting screws 50. These gates can be moved up and down by means of screws 50 either for adjusting the thickness 52 of ribbon 40 or for adjusting its width 41. The thickness 52 is adjusted by merely adjusting the gap between the gate members 48 and anvil 49, while width 41 is adjusted by either opening or closing completely the gate members 48. The closing is accomplished by lowering gates 48 until they engage or press on anvil 49, as will be pointed out more in detail in connection with the description of FIG. 9. In the light of the above description of the extruder, the following nomenclature will be used in referring to the three rollers of the extruder. Roller 36 will be called the "common roller" because it is common to the other two rollers 37 and 38. Roller 37 will be called the "gauging roller" because it controls the thickness of the intermediate portion 47 of the ribbon which adheres to the common roller 36 and then is fed into the calender rollers 36 and 38. In order to achieve proper control of the material as it follows through the extruder, it is necessary to have the following speed relationships between the respective rollers. If the respective angular velocities are:

$\omega_1$ = the angular velocity of the common roller 36,
$\omega_2$ = the angular velocity of the gauging roller 37, and
$\omega_3$ = the angular velocity of the calender roller 38, then $$\omega_1 > \omega_2 \quad (1)$$
$$\omega_1 = \omega_3 \quad (2)$$

$\omega_1$ is greater than $\omega_2$ by approximately ten percent (10%). The angular velocity of roller 37 is made adjustable and, therefore, the above relationship between $\omega_1$ and $\omega_2$ can be varied so as to obtain proper "tracking" of the rollers by the rubber stock, the above tracking referring especially to the adherence of the intermediate ribbon portion 47 to the common roller 36 rather than its following of roller 37.

The drive mechanism for the extruder is illustrated in FIG. 4. A direct current motor 54 is connected to a gear box 55 which in turn is connected to roller 37 through a series of V-belt drives 56. Gear box 55 is the so-called double-reduction gear box which has two sets of gears for reducing the speed of motor 54 to that desired on roller 37. Motor 54 is provided with a control system 57 which is used for controlling current through the armature and the excitation of the field windings of motor 54. This in turn controls the speed and the torque of this motor. In one specific embodiment of the invention, motor 54 is a fifteen horsepower motor, whose speed can be varied between 2200 r.p.m. and 500 r.p.m. by means of control 57. Accordingly, the gauging roller 37 has an independent drive, i.e., which is independent of the drive provided for the rollers 36 and 38.

The drive for rollers 36 and 38 is provided by the second direct current motor 58, which is connected to a double-reduction gear box 59 by means of a plurality of V-belts 60. The gear box 59 in turn is connected to roller 38 through a shaft 61 which is supported by frame members 62 and 63 of the extruder. Shaft 61 is geared to a shaft 64 (see FIG. 9) by means of gears 65 and 66. Accordingly, calender rollers 36 and 38 revolve at the same angular velocities. In one extruder capable of producing a thirty-six inches wide ribbon of two and three-quarters inches thickness, motor 58 is a forty horsepower motor.

Referring now to FIG. 6, which once more illustrates a portion of the extruder, and especially the transverse vertical section of the rollers 36, 37 and 38, the additional elements which now appear in FIG. 6 are the two adjustable side guides or retainers 67 and 68, which include transverse rods 69 and 70, said guide members 71 and 72, hub members 73 and 74 which comprise integral parts of the respective side guide members 71 and 72, and an interconnecting plate 75 which is connected to hub members 73 and 74 by means of proper slots within the hub members for inserting plate 75 and bolts 76 and 77 which fasten plate 75 to the respective hubs. Hub 74 is also connected by means of a similar plate 78 to an adjustable side cheek 79, which is also connected to a transverse rod 80 supporting this cheek. The transverse positions of the two side guide members 71 and 72, and of cheek 79, can be adjusted simultaneously and synchronously, and by the same transverse increments, for reducing the width 41 of ribbon 40 produced by the extruder. This will be described more in detail in connection with FIGS. 8, 9, 10 and 11.

Before proceeding with this description, it should be mentioned in concluding the description of FIG. 6 that the adjustable side guide members 71 and 72 and cheek 79 all perform the same function, and that is to constrict the side travel of the incoming head stock 16 and of the outgoing ribbon 40. In order to achieve the above, the extruder is provided with two sets of such side guides or restrainers and two sets of cheeks so that the side-wise travel of the rubber stock is restricted on both sides by the above side members.

The blade holder 33 is held in proper position with respect to roller 36 by means of two arms, arm 81 only being visible in FIG. 6. These two arms are supported by transverse bolts 82. Arm 81 is rotatably mounted on bolts 82 and, therefore, when arm 81 is swung away, it also carries along blade holder 33, bars 14 and 35 and die member 48 into the position illustrated by dotted lines whenever it is necessary to repair or clean the roller. Blade holder 31 is bolted by means of four bolts to frame members 62 and 63.

FIG. 7 illustrates, on an enlarged scale, a transverse section through blade 43 and blade holder 31. It also illustrates that portion of roller 38 which normally engages blade 43. As illustrated in FIG. 7, the recessed surface 83 of blade holder 31 enables knife 43 to bend until knife 43 engages roller 38 in the manner illustrated in the figure. Since the rubber stock 84 which is directly in front of die members 48 and 49, is at relatively high pressure, it is capable of transmitting this same pressure to knife 43, with the result that this knife has a constant positive engagement with roller 38. The construction of knife 39 and knife holder 33 is identical to that illustrated in FIG. 7.

Referring now to FIGS. 8 through 11, the extruder includes two side frame members 62 and 63 which are provided with proper flanges 86 and 87 which are used for bolting the frame members 62 and 63 to a bed plate or floor. The side members 62 and 63 are braced or connected to each other with a plurality of frame members, such as members 35, 14 and 88 through 91. All of these members, and the side members 62 and 63, provide a rigid box frame for the entire extruder. The side frame members 62 and 63 are provided with proper bearings for supporting the three rollers 36, 37 and 38. Since it is necessary to adjust the position of roller 37 with respect to the fixed roller 36, and the position of roller 38 also with respect to the fixed roller 36, it becomes necessary to provide suitable adjusting means for the hubs of rollers 37 and 38. This means is illustrated in FIG. 10. In FIG. 10, the three rollers are hidden by frame member 63 and, therefore, are not visible. The rollers are provided with shafts 96, 97 and 98, respectively. Shaft 96 rotates within hexagonal bearing housings 99 of FIG. 10, which is held in fixed position with respect to frame members 62 and 63. An identical second member is provided for the other end of shaft 96. The frame members 62 and 63 are provided with corresponding hexagonal openings for accommodating the hexagonal bearing housings 99. Proper set screws are provided for retaining the hub members 99 in fixed relationship with respect to the respective frame members 62 and 63. Shafts 97 and 98 are also provided with the hexagonal hub members 100 and 101. In this case, the frame members 62 and 63 are provided with openings 102 and 103. These openings also include sliding surfaces 104 through 107, which are engaged by the matching flat sliding sides of the hexagonal members 100 and 101. The hexagonal hubs 100 and 101 are also provided with pad members 108 and 109 which have proper means for slidingly engaging the respective set screws 110 and 111. The frame members 62 and 63 have threaded bores for accommodating the adjusting screws 110 and 111 and, therefore, it becomes possible to adjust the position of rollers 37 and 38 with respect to the fixed roller 36 by means of the adjusting set screws 110 and 111. The micrometer set screws 110 and 111 are provided with proper dials and needle indicators for indicating the settings of the micrometer screws so as to insure strict parallelism between the three axes of the shafts 96, 97 and 98. It is desirable to have such parallelism so as to have uniform feeding of the rubber stock throughout the transverse dimension of the extruder, from one end of the roller to the other, and also from one end of the die to the other.

FIG. 10 also illustrates the motor-controlled adjusting means for the die guide members 71 and 72, and also for the cheek member 79. Motor 112 is mounted on frame member 63 and is connected through an appropriate gear reduction box to a sprocket wheel 113. The sprocket wheel is connected through a sprocket chain 114 to the sprocket wheels 115, 116 and 117. These sprocket wheels form threaded engagements with the threaded portions of the rods 69, 70 and 80, which correspond to the similarly numbered rods in FIGS. 6, 8, 9 and 11. The sprocket wheels are rotatably mounted in a frame member 63 and the hubs of sprocket wheels 115, 116 and 117, such as hub 118 of sprocket wheel 117, also form a threaded engagement with the respective threaded portions of the rods previously mentioned, i.e., rods 69, 70 and 80. Accordingly, by rotating the sprocket wheels either in one direction or the other, the side guide members 71 and 72, and the cheek member 79, are adjusted either in one direction or the other, as illustrated by a double arrow 120 shown in FIG. 11. The corresponding guide member 121 (FIG. 11) on the opposite side of the extruder is bolted to the frame member 62 and, therefore, remains in fixed position. Accordingly, the width 41 of the final ribbon 40 is adjusted by adjusting the side guide members 71 and 72 and cheek 79 with respect to the corresponding fixed elements which are attached to the frame member 62.

The operation of the gate members 48 and of the gate adjusting screws 50 has already been described in connection with FIG. 5. Examination of FIG. 9 illustrates that the extruder is provided with a large number of gate members 48 which extend transversely from one end of the machine to the other. As mentioned previously, the gates are held in proper position on one side by the blade holder 33 and on the other side by the die bridge including transverse plate 35 and truss member 88 and the stress-transmitting members 89, 90 and 91 of the truss which interconnect transverse plate 35 and truss member 88. The end gates 48a and 48b are also held in proper transverse position by means of the fixed end members 126 and 127 (FIG. 8). As illustrated in FIG. 9, those of the gates which are in direct alignment with the gap illustrated by the dimensional arrow 128 are open to the extent determined by the desired thickness 52 (see FIG. 5) of ribbon 40, this opening being achieved by adjusting the adjusting screws 50. The remaining gates are closed and, therefore, rest against anvil 49. Accordingly, the rubber stock can pass only through that portion of the die where the gates are open. The dimension 128 in FIGS. 8, 9 and 11 indicates the transverse dimension between the adjustable side guides 67 and 68 and the fixed side guide 121. Accordingly, it is that dimension which determines the width 41 (see FIG. 8) of ribbon 40.

The machine is also provided with two knives 130 and 131 (see FIG. 9), which are used for trimming the two side edges of ribbon 40. The transverse position of knife 131 can be adjusted by means of an adjusting screw 132 while the angular positions of the knives 130 and 131 can be adjusted by means of the worm gears 134 and 135. The trimmed edges 9 and 9a (see FIG. 1) are then picked up by a conveyor 8 and returned to mill 2, the final width 150 of the trimmed ribbon 40 being slightly narrower, after trimming, than the side edges 9 and 9a.

Only a brief description of the operation of the entire apparatus should suffice because its mode of operation should be apparent from the given description of the apparatus itself. The thermoplastic material is fed into a series of warm-up and kneading mills 2, 3 and 4, where its temperature is raised and the ribbon stock 16 is made homogenous in terms of composition, density and temperature. The temperature of ribbon 16 is controlled by controlling the temperature of the roller mills 2, 3 and 4, which may require warming up by such means as steam at the time the mills are started. However, as a rule, after a relatively short period of time, the rollers maintain their own temperature without any external source of heat because of the friction furnished by the thermoplastic material. If the characteristics of the material are such that the above friction raises the temperature of the rollers to an excessive extent, then the rollers are water-cooled for maintaining constant the temperature of ribbon 16 and of the entire stock going through the roller mills. Accordingly, there is no inherent difficulty in controlling the temperature of the thermoplastic stock as it travels through this portion of the operation.

The width and the thickness of ribbon 16 are adjusted so as to correspond to that speed which is required for extruding ribbon 40 on the output side of the three-roller extruder. The position of knife 22 in FIG. 2 is adjusted so as to produce ribbon 16 of sufficient width 21 to satisfy the rate of extrusion desired at the extruder 34, thus satisfying the continuity equation through the entire apparatus. The operation of the three-roller extruder 34 has already been given in the course of its description. The thickness of ribbon 47, leaving the gauging mill composed of rollers 36 and 37, is controlled by adjusting the spacing between the rollers 36 and 37, and proper feeding of ribbon 47 into the calender mill, comprising rollers 36 and 38, is achieved by adjusting the speed of the rollers 36 and 37 so that the angular velocity $\omega_1$ of the common roller 36 is somewhat higher than the angular velocity $\omega_2$ of the gauging roller 37. The above is described more in detail in connection with Equation 1.

As indicated by Equation 2, the angular velocities $\omega_1$ and $\omega_3$ are equal, which are the angular velocities of the common roller 36 and calender roller 38 respectively. After the thermoplastic material leaves the calender mill composed of rollers 36 and 38, it enters the die chamber defined by the transverse members 33 and 31 and the side members, or cheeks, 79, only one such cheek being visible in FIG. 6. This chamber is also defined by the gate members 48, anvil 49; the two side members 126 and 127 (FIG. 8) also act as the inner walls of this chamber if, or when, all of the gauge members 48, including the extreme left and right gauge members, or fingers, 48a and 48b (see FIG. 8) are also lifted by means of their respective adjusting screws 50 so that the entire available width of the adjustable die is opened. As mentioned previously, it is possible to vary the width and the thickness of the final ribbon stock 40 by adjusting the gate members 48 and also by adjusting the position of the trimming knife 131 (FIG. 9). Since the stock material 16 is fed into the three-roller extruder and then into its die by means of the three rollers 36, 37 and 38, rather than by an endless screw feed, the temperature of stock 84 (see FIG. 5) within the die chamber is well within the safe limits; if the thermoplastic material so requires, its temperature within the die chamber can be controlled very readily by controlling the temperature of the rollers 36, 37 and 38. The methods and means for controlling the temperature of such rollers is well-known in the art and, therefore, has not been illustrated in any of the figures, neither in connection with the warm-up mills 2, 3 and 4 nor the extruder 34.

Accordingly, the method and the apparatus produces a thermoplastic ribbon stock 40 which has uniform or homogenous density and composition. The composition of ribbon 40 is unimpaired by the products of decomposition (chemical break-down of the normal molecular structure of the material when it is subjected to excessive temperatures) which, at times, are present in such ribbon when it is extruded according to the methods known to the prior art in which the ribbon stock unavoidably experiences an excessive rise in temperature which cannot be controlled effectively in the known apparatus. The apparatus also discloses ready means for adjusting very readily and quickly the width, as well as the thickness, of ribbon 40 through a very wide range of limits, which has not been possible to achieve with the known apparatus. Accordingly, with the disclosed apparatus, it is possible to produce, as a continuous ribbon, a ribbon stock of variable width and thickness by merely adjusting the extrusion die. As has been mentioned in the introductory part of the specification, such wide range is achieved by the prior methods only by using a plurality of machine rather than one machine.

What is claimed as new is:

1. An apparatus for converting raw thermoplastic stock into a finished, continuous ribbon, said apparatus including a plurality of serially arranged warm-up and kneading mills, knife means at said mills for cutting a first ribbon of said stock, conveyor means for conveying said first ribbon from each said mill to the next such mill, the last of said warm-up and kneading mills including adjustable knife means for cutting out a narrower second ribbon from said first ribbon, an extruder, further conveyor means for moving said narrower second ribbon from said last mill to said extruder, said extruder comprising first, second and third rollers, said first roller being positioned between said second and third rollers, said first and second rollers comprising a gauging mill receiving said second ribbon from said last warm-up and kneading mill, and said first and third rollers comprising a calender mill receiving said second ribbon from said gauging mill, first prime mover means rotating said second roller, second prime mover means rotating said first and third rollers at angular velocities equal to one another and greater than the angular velocity of said second roller, said rollers being rotated toward each other to produce co-rotating endless surfaces at the point of engagement of said rollers with said thermoplastic stock, an adjustable die receiving the calendered stock from said first and third rollers, said adjustable die including a first fixed side-guide having portions disposed adjacent corresponding first ends of each of said first, second and third rollers as well as adjacent a first end of said die, an adjustable second side-guide spaced from said first guide and having further portions adjacent said first, second and third rollers and adjacent said die, means for simultaneously moving said further portions of said second guide relative to said fixed first guide thereby to adjust the spacing between said first and second side guides, said gauged and calendered stock being confined between said first and second guides as it passes through said gauging and calender mills toward an opening in said die, and means for adjusting said opening in said die for producing a finished ribbon of desired cross-sectional area.

2. The apparatus as defined in claim 1 in which said first roller is a fixed position roller and first and second means for, respectively, adjusting the positions of the second and third rollers with respect to said first roller.

3. The apparatus as defined in claim 1 which also includes a first blade in pressure engagement with said first roller, a first blade-holder, said first blade and blade-holder extending across the entire length of said first roller, only a lagging portion of the blade engaging said plate holder, whereby said blade is cantilevered from said holder, said first blade and blade-holder being positioned between said first roller and said die, a second blade and blade-holder, said blade being cantilevered from its holder and extending across the entire length of the third roller between said third roller and said die, the opposed surfaces of said blades and said holders constituting the top and bottom boundaries of a chamber existing between said first and third rollers and the upstream side of said die, the side-walls of said chamber being defined, respectively, by the corresponding portions of said first fixed side-guide on one side and said adjustable second side-guide on the other side, the pressure exerted by the pressurized thermoplastic stock entering said chamber from said first and second rollers keeping said first and second cantilevered knives in pressure engagement with the first and third rollers, respectively.

References Cited in the file of this patent
UNITED STATES PATENTS

| | | |
|---|---|---|
| 1,252,821 | Lewis | Jan. 8, 1918 |
| 2,651,076 | Hornbostel | Sept. 8, 1953 |
| 2,720,679 | Ratliff | Oct. 18, 1955 |
| 2,749,571 | Pasquetti | June 12, 1956 |
| 2,756,459 | Kellner | July 31, 1956 |
| 2,771,388 | Rocky et al. | Nov. 20, 1956 |
| 2,807,047 | Olson et al. | Sept. 24, 1957 |

FOREIGN PATENTS

| | | |
|---|---|---|
| 339,890 | Italy | Apr. 29, 1936 |